Sept. 29, 1970     E. J. DE RIDDER     3,530,702
EXTRUDING METHOD AND APPARATUS AND PARTS THEREFOR
Filed Aug. 29, 1967                                  9 Sheets-Sheet 3
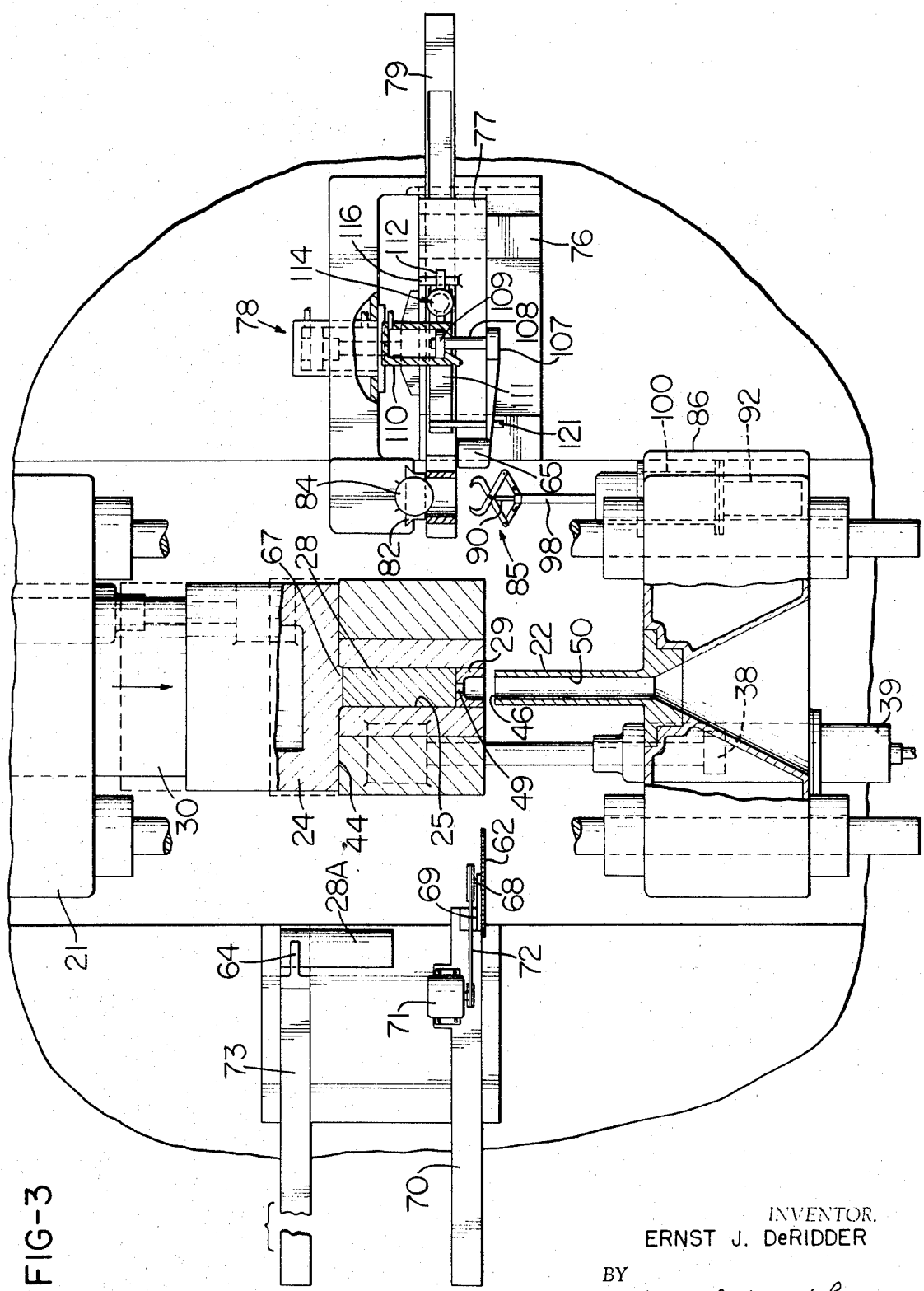
INVENTOR.
ERNST J. DeRIDDER
BY
Glenn, Palmer & Lyne
HIS ATTORNEYS

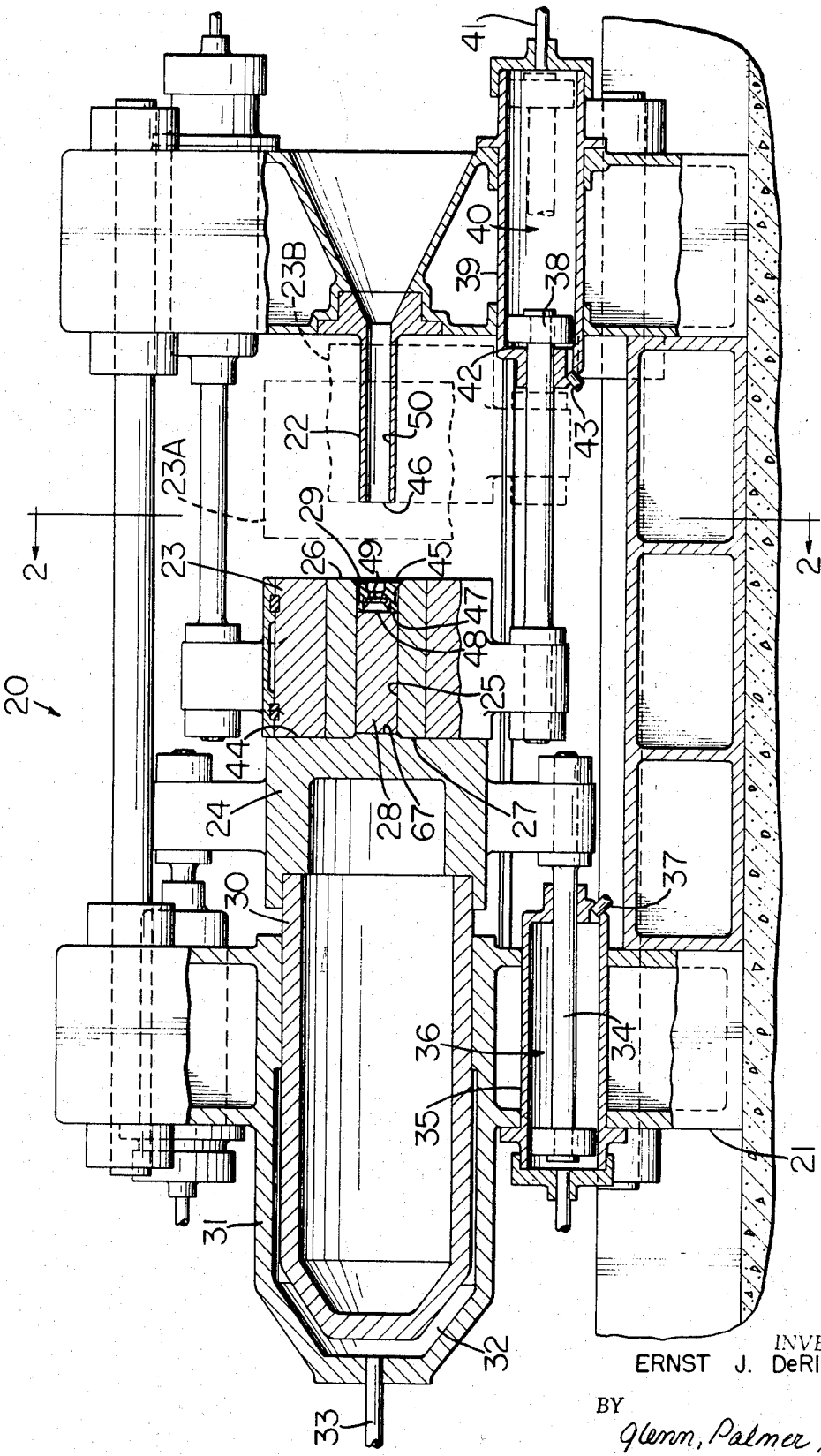

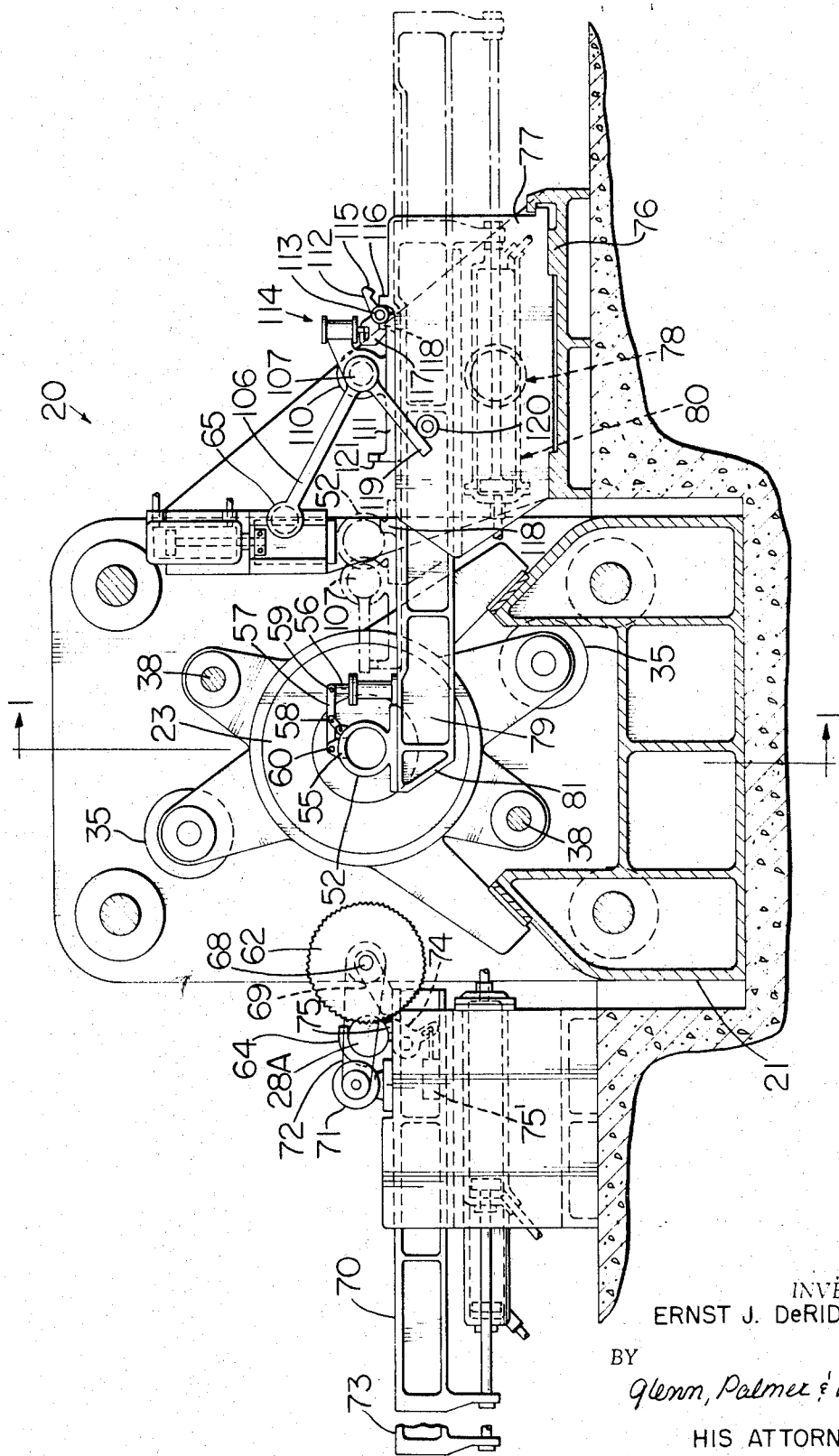

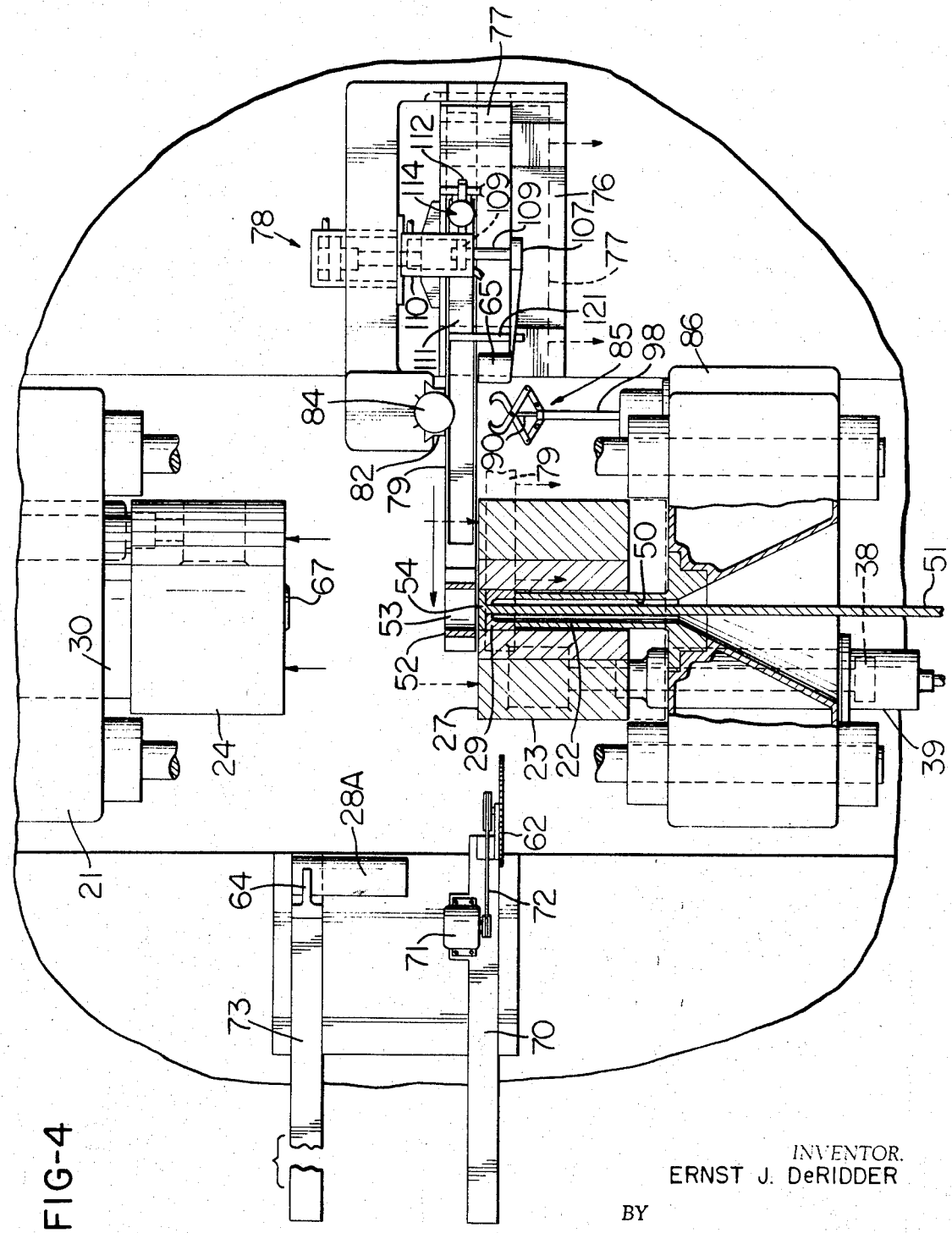

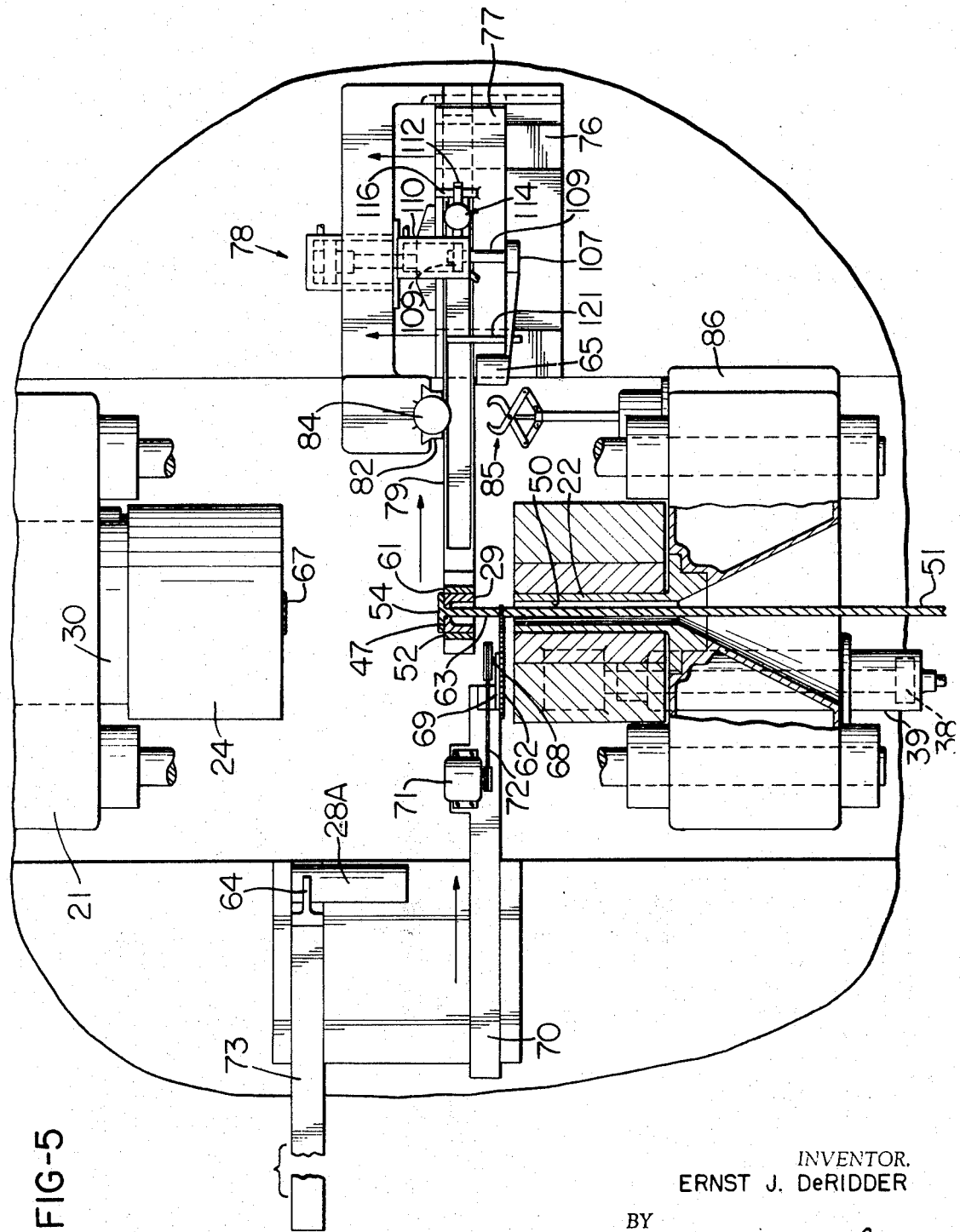

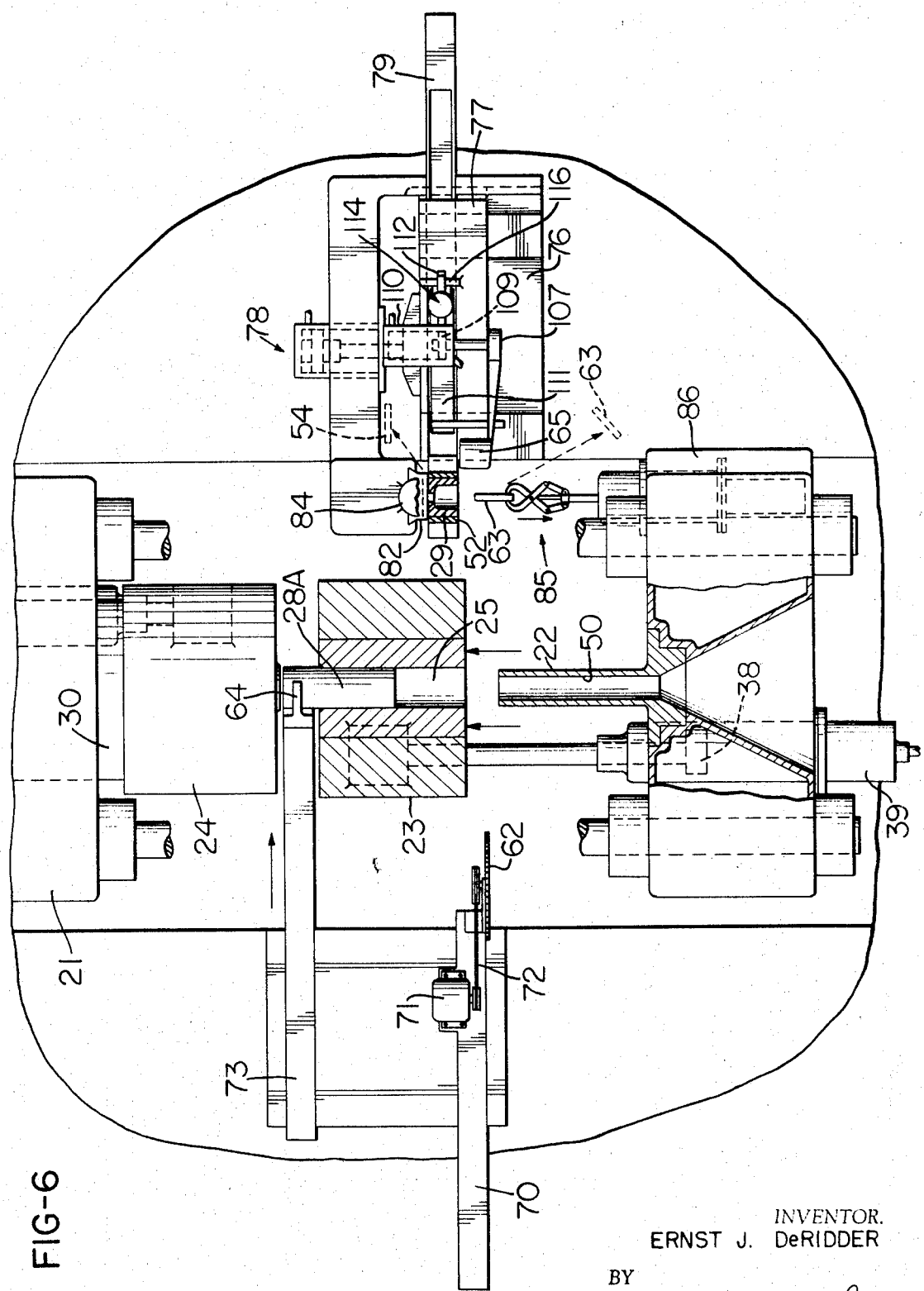

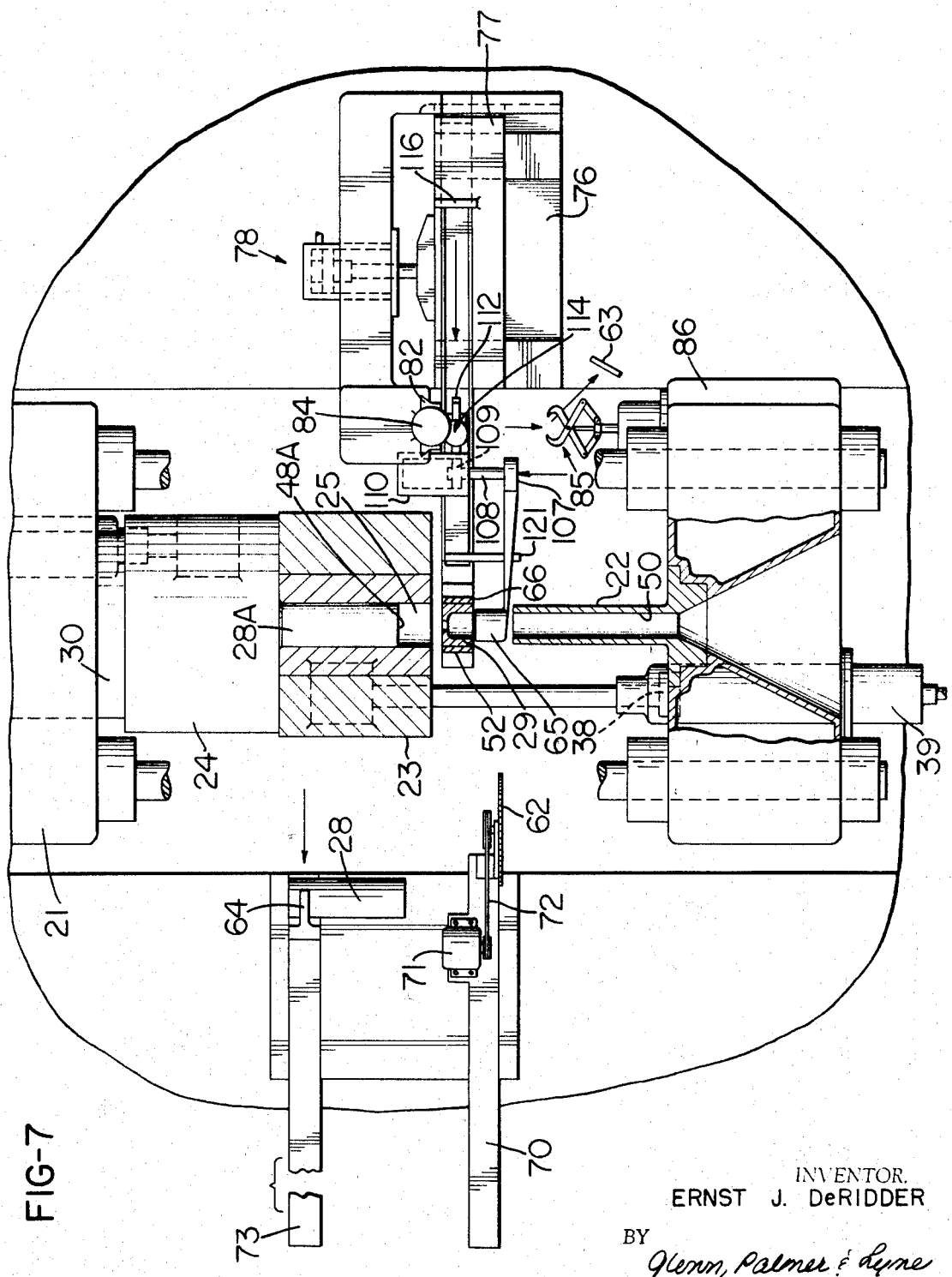

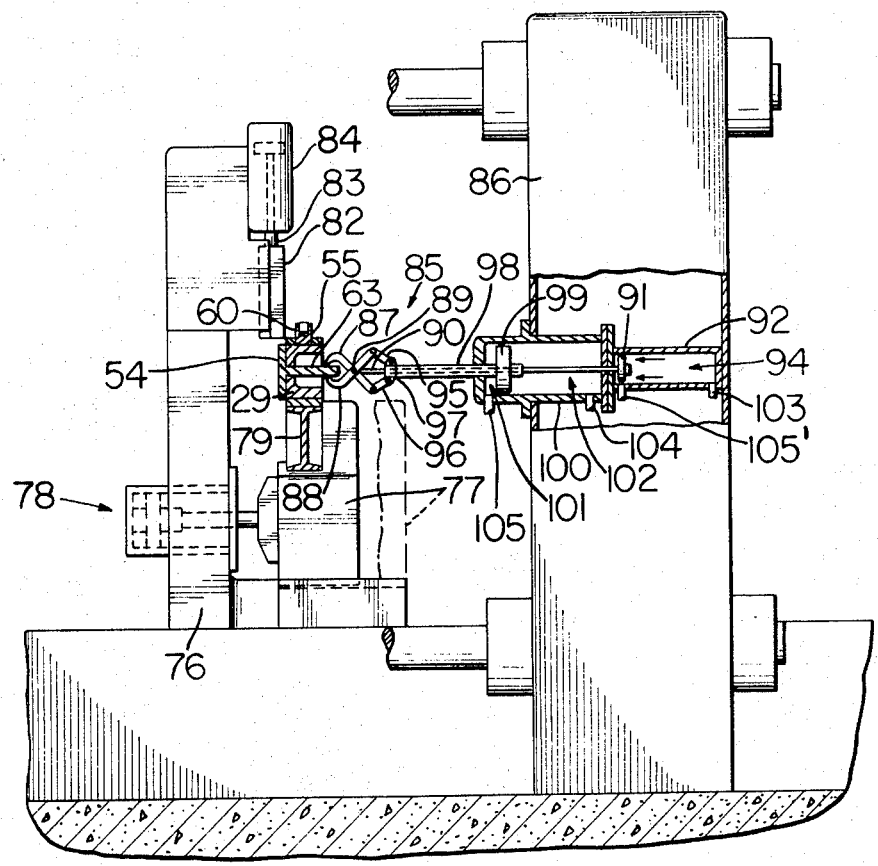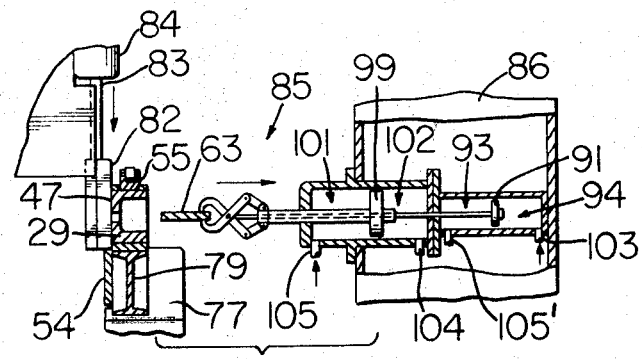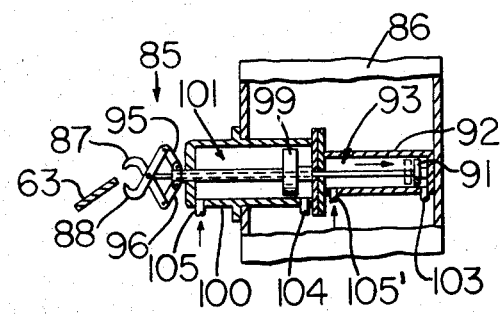

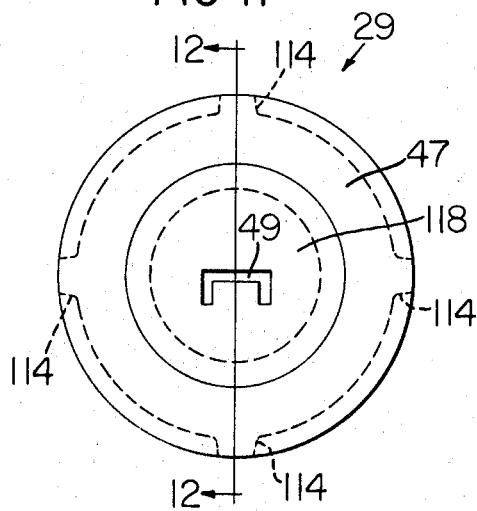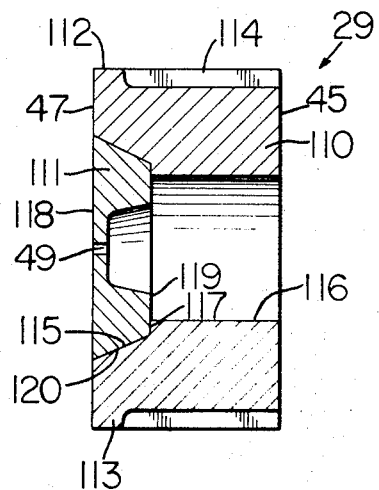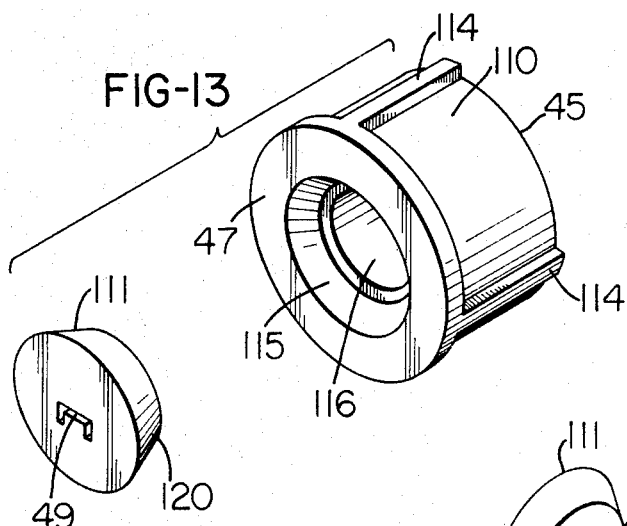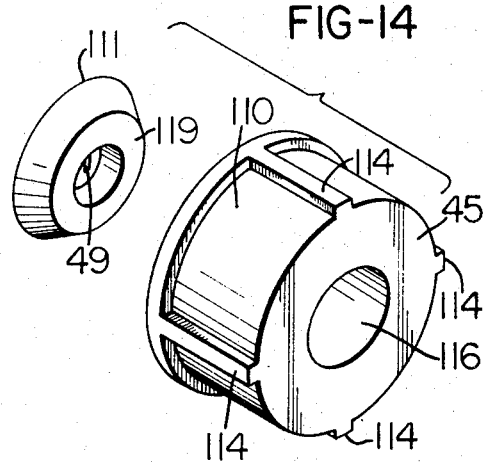

United States Patent Office 3,530,702
Patented Sept. 29, 1970

3,530,702
EXTRUDING METHOD AND APPARATUS AND PARTS THEREFOR
Ernst J. De Ridder, Henrico County, Va., assignor to Reynolds Metals Company, Richmond, Va., a corporation of Delaware
Filed Aug. 29, 1967, Ser. No. 664,083
Int. Cl. B21c 23/00
U.S. Cl. 72—255                                        24 Claims

ABSTRACT OF THE DISCLOSURE

This disclosure relates to a method and apparatus for extruding an elongated member from a heated metallic billet by disposing the billet in a container together with a separate female die so that when the container and die are moved toward a stationary ram to engage the die against a front end of the stationary ram, further movement of the container and billet toward the ram relative to the engaged die causes the billet to extrude through the die until the billet has been extruded to the desired amount. The die is subsequently removed from the container out through the other end thereof by having the other end of the container moved beyond the front end of the ram to force the die out of the container into a die receiver, the removed die being cleaned and returned to the front end of the container by the die receiver for a subsequent extruding operation.

BACKGROUND OF THE INVENTION

During an indirect extruding operation wherein the female die engages against one end of the metallic billet with subsequent relative movement between the billet and the die to cause the billet to extrude through the die, a problem exists in subsequently removing that die from the container that held the billet during the extruding operation to not only prevent wearing out of the container and the die, but also to economically effect a subsequent extruding operation with the same container and die.

SUMMARY

This invention provides an improved method and apparatus for not only effecting an indirect extrusion of a billet through a female die and the like, but also this invention provides an improved method and apparatus for effectively removing the die from the apparatus for a subsequent cleaning operation thereof so that the die means can be automatically returned to the apparatus for subsequent extruding operations without adversely wearing out the die and container.

Other details, uses and advantages of this invention will become apparent as the following description of the present preferred embodiment thereof presented in the accompanying drawings proceeds.

DESCRIPTION OF THE DRAWINGS

The accompanying drawings illustrates a present preferred embodiment of this invention, in which:

FIG. 1 is a fragmentary, cross-sectional view of the apparatus of this invention and is taken substantially along line 1—1 of FIG. 2, with the apparatus being in a different operating position from the position illustrated in FIG. 2;

FIG. 2 is a fragmentary, cross-sectional view taken substantially along the line 2—2 of FIG. 1, with the apparatus illustrated in full lines in FIG. 2 being in a different operating position from the position illustrated in FIG. 1;

FIG. 3 is a top view of the apparatus illustrated in FIG. 1, with certain parts thereof being broken away and illustrated in cross section;

FIG. 4 is a view similar to FIG. 3 and illustrates the apparatus in its final extruding position;

FIG. 5 is a view similar to FIG. 3 and illustrates the apparatus in its die removing position;

FIG. 6 is a view similar to FIG. 3 and illustrates the apparatus in its die cleaning position;

FIG. 7 is a view similar to FIG. 3 and illustrates the apparatus in its die inserting position;

FIG. 8 is a fragmentary side view of the apparatus of FIG. 1 and illustrates the die cleaning apparatus;

FIG. 9 is a fragmentary view similar to FIG. 8 and illustrates certain of the operating steps of the apparatus for cleaning the die means;

FIG. 10 is a view similar to FIG. 9 and illustrates another step in the die cleaning operation;

FIG. 11 is an enlarged front view of the die holder and die of the apparatus of this invention;

FIG. 12 is a cross-sectional view taken on line 12—12 of FIG. 11;

FIG. 13 is an exploded front perspective view of the die holder and die of FIG. 11, and FIG. 14 is an exploded rear perspective view of the die holder and die of FIG. 11.

DESCRIPTION OF THE ILLUSTRATED EMBODIMENT

Referring now to FIGS. 1 and 2, the extruding apparatus of this invention is generally indicated by the reference numeral 20 and comprises a stationary supporting frame 21 carrying a stationary ram 22, a movable container 23 and a movable crosshead 24, the container 23 having a substantially cylindrical chamber 25 passing centrally therethrough and interrupting the opposed ends 26 and 27 thereof.

A heated metallic billet 28 is adapted to be disposed in the chamber 25 of the container 23 through the rear end 27 thereof in a manner hereinafter described while a female die assembly 29 is also adapted to be disposed in the chamber 25 of the container 23 through the front end 26 thereof in the manner illustrated in FIG. 1, the die assembly 29 being referred to hereinafter as die 29 and the details thereof will be fully described in connection with FIGS. 11–14.

The crosshead 24 is secured to a piston 30 movably disposed in a high pressure cylinder 31 carried by a stationary frame 21, the piston 30 and cylinder 31 cooperating together to define a chamber 32 for receiving high pressure hydraulic or pneumatic fluid from a conduit 33 to force the crosshead 24 to the right in FIG. 1 for an extruding operation on the billet 28 in a manner hereinafter described.

In order to return the crosshead 24 back to the left in FIG. 1 after an extruding operation, the crosshead 24 is interconnected to a plurality of piston members 34 disposed in stationary cylinders 35, each piston member 34 cooperating with its respective cylinder 35 to define a chamber 36 for receiving low pressure hydraulic or pneumatic fluid from a conduit 37 to move the crosshead 24 and main piston 30 back to the left in FIG. 1 as will be apparent hereinafter.

The container 23 is also interconnected to a plurality of pistons 38 cooperating with a plurality of cylinders 39 carried by the statioary frame 21, each piston 38 cooperating with its respective cylinder 39 to define a chamber 40 adapted to receive low presure hydraulic or pneumatic fluid from a conduit 41 to not only return the container 23 to the left in FIG. 1 after an extruding operation, but also to maintain sealing contact between the container 23 and the crosshead 24 during an extruding operation, as will be apparent hereinafter. In addition, each piston 38 cooperates with its respective cylinder 39 to define another chamber 42 to receive low pressure hydraulic or pneumatic fluid from a conduit 43 to move the container 23 to the right in FIG. 1 independently of the crosshead 24 for a die removing operation, as will be apparent hereinafter.

GENERAL OPERATION

After the billet 28 and die 29 are disposed in the position illustrated in FIG. 1 in the container 23 in a manner more fully described hereinafter, the crosshead 24 is moved to the right by high pressure fluid being directed to the chamber 32 of the apparatus 20 so that the forward face 44 of the crosshead 24 engages against the rear side 27 of the container 23 to not only close off the left end of the chamber 25, but also to move the container 23 in unison therewith to the right toward the stationary ram 22. During such movement of the container 23 to the right in FIG. 1, low pressure fluid is directed to the chambers 40 of the cylinders 39 by the conduits 41 to tend to move the container 23 to the left in opposition to the movement of the crosshead 24 to the right to effect a positive sealing and closing off of the left-hand end of the chamber 25 of the container 23 so that the billet 28 cannot extrude between the surfaces 27 and 44 of the container 23 and crosshead 24 during the subsequent extruding operation of the billet 28. For example, the crosshead 24 can be moving to the right for an extruding operation with a force of approximately 2500 tons, while the container 23 is tending to be moved to the left by a force of approximately 200 tons, the fluid being directed to the chambers 4 passing through suitable pressure regulators to maintain such 200-ton pressure during the movement of the container 23 by the crosshead 24.

As the container 23 is being moved to the right in FIG. 1 by the crosshead 24, the side 45 of the die 29 subsequently engages against the front end 46 of the stationary ram 22 whereby further movement of the die 29 to the right in FIG. 1 is prevented by the ram 22. However, after the side 45 of the die 29 engages the ram 22, the container 23 and billet 28 are further and continuously moved to the right in FIG. 1 by the moving crosshead 22 relative to the engaged and now stationary die 29 whereby the now stationary side 47 of the die 29 acts against the forward end 49 of the moving billet 28 to indirectly extrude the same through the shaping cavity 49 of the die 29 and into a passage 50 of the ram 22 in the manner illustrated in FIG. 4 to define an elongated extruded member 51.

Such movement of the crosshead 24 to the right in FIG. 1 continues till the container 23 reaches approximately the dotted line position illustration by the reference numeral 23A in FIG. 1, whereby substantially the entire billet 28 has been indirectly extruded through the die 29 to produce the elongated extruded member 51, as illustrated in FIG. 4.

After the container 23 has been moved to the position 23A in FIG. 1 by the crosshead 24, the crosshead 24 is moved away from the ram 22 to the full line position illustrated in FIG. 4 and the container 23 is further moved to the right in FIG. 1, by fluid being directed to the chambers 42 of the cylinders 39, from the dotted line position 23A to the dotted line position illustrated by the reference numeral 23B in FIG. 1 for a die removing operation.

In particular, after or as the crosshead 24 has moved the container 23 to the full line position illustrated in FIG. 4, a die receiver or carrier 52 is moved adjacent the rear 27 of the container 23 as illustrated in FIG. 4 and has a cylindrical die receiving chamber 53 passing therethrough and coaxially aligned with the chamber 25 of the container 23.

The die receiver 52, after being positioned behind the container 23 as illustrated in FIG. 4, moves in unison with the container 23 further toward the ram 22 whereby the movement of the container 23 from the position illustrated in FIG. 4, by pressure fluid being directed into the chambers 42 of the cylinders 39, causes the die 29 and the remaining billet butt 54 to be forced out of the rear end 27 of the container 23 by the stationary ram 22 and into the chamber 53 of the die receiver 52 in the manner illustrated in FIG. 4, the die reeciver 52 positively clamping the die 29 therein when the die 29 is fully telescopically received therein by having a segment 55, FIG. 2, of the die receiver 52 urged radially inwardly by a pneumatically or hydraulically operated piston member 56 being interconnected to the segment 55 by a link 57 pivotally mounted to the die receiver 52 by a pivot pin 58 and to the piston rod 56 and segment 55 by pivot pins 59 and 60. In this manner, the die 29 is positively held in the die receiver 52 with its side 47 being coplanar with the side 61 of the die receiver 52 for a purpose hereinafter described.

With the die 29 now firmly held in the die receiver 52, the die receiver 52 can be moved back to the full line position illustrated in FIG. 5 relative to the container 23 and carry the billet butt 54 and the still interconnected extruded member 51 therewith. At this time, a severing saw 62 can be moved inwardly from the position illustrated in FIG. 4 to the position illustrated in FIG. 5 to sever the extruded member 51 adjacent the die 29 so that the major portion of the extruded member 51 can be removed from the ram 22 and the remaining extruded part 63 will remain with the die 29 and still be interconnected to the billet butt 54.

After the extruded member 51 has been separated from the removed die 29 in the manner illsutrated in FIG. 5, the die receiver 52 is moved from the position illustrated in FIG. 5 to the position illustrated in FIG. 6 in a manner hereinafter described to subsequently have the billet butt 54 and extruded part 63 removed from the die 29 at the illustrated die servicing zone, the saw 62 also being moved back to the position illustrated in FIG. 6.

A new billet 28A in FIG. 4 is advanced from the full line position illustrated in FIG. 4 by a billet carrier 64 into coaxial alignment with the chamber 25 of the container 23 in the manner illustrated in FIG. 6 so that after the die receiver 52 has been moved to the full line position of FIG. 6, the container 23 can be moved back toward the crosshead 24 by fluid being directed to the chambers 40 of the cylinders 39 and while the container 23 is moving back toward the crosshead, the container 23 will telescopically receive the new billet 28A in the rear end 27 of the chamber 25 thereof as illustrated in full lines in FIG. 6.

When the container 23 reaches the position illustrated in FIG. 6, the billet carrier 64 is retracted back to the position illustrated in FIG. 4 so that further movement of the container 23 toward the crosshead 24 will fully position the new billet 28A in the chamber 25 thereof, as illustrated in FIG. 7, and the container 23 will be disposed against the crosshead 24.

With the loaded container 23 now disposed in the position illustrated in FIG. 7, the die receiver 52 is again advanced into coaxial alignment with the chamber 25 of the container 23 at the front side thereof, as illustrated in FIG. 7, so that the cleaned die 29 is coaxially aligned with the chamber 25. A die inserter 65 is now located on the side 66 of the die receiver 52 and is subsequently moved toward the container 23 relative to the die receiver 52 to push the die 29 from the die receiver 52 into the front end 26 of the chamber 25 of the container 23 to be positioned against the forward end 48A of the new billet 28A for a subsequent extruding operation therefrom in the manner previously described for the billet 28 after the die receiver 52 and die inserter 65 have been retracted out of alignment with container 23.

Therefore, it can be seen that the method and apparatus of this invention fully permit an automatic, indirect extruding operation wherein the female die 29 is separate from the ram 22 and container 23 to be inserted in the front side of the container 23 before the extruding operation and be removed out of the rear side thereof after the extruding operation whereby the die 29 will not adversely wear out the interior walls of the container 23 and can be readily cleaned in a manner hereinafter described to be again utilized for an extruding operation in an automatic manner.

In particular, since the die 29 of this invention is placed in the front end 26 of the container 23 and is subsequently removed from the rear end 27 thereof by the die receiver 52 so as to be subsequently replaced in the front end 26 of the container 23, there is no unnecessary wearing out of both the die 29 and the interior wall of the container 23 by requiring that the die member 29 be moved back from the left to right as in conventional indirect extruding apparatus where such die 29 is secured to the end 46 of the ram 22, such retraction of the fastened die 29 not only wearing out the die 29 not only wearing out the die and container, but also fouling the tooling because the retracting die skims off part of the thin layer of billet metal adhering to the inner peripheral wall of the container that was formed by the previous extruding operation.

CROSSHEAD 24

While the crosshead 24 illustrated in FIG. 1 has an extension 67 extending outwardly from the front surface 34 thereof to be received in the left-hand end of the chamber 25 to assist in sealing off the left-hand end of the chamber 25 for the reasons previously set forth, it is to be understood that the crosshead 24 could include a mandrel that extends from the surface 44 thereof to cooperate with the die 29 to extrude a hollow or tubular member from the billet 28 rather than a solid extruded member 51 in the manner described.

Also, for billets 28 of shorter length, the part or extension 67 of the crosshead 24 could be longer to fill the rear end 27 of the chamber 25 of the container 23. Alternately, another billet or separate mandrel could be disposed in the rear end 27 of the container 23 in place of the extension 67 of the crosshead 24.

In addition, while the crosshead 24 and other parts of the apparatus 20 previously described and later to be described are all illustrated as being pneumatically or hydraulically operated, it is to be understood that such movable parts of the apparatus 20 could be cam operated or mechanically or electrically moved in any desired manner and the hydraulic moving means illustrated and described are merely for the purpose of setting forth one example of an operating structure.

SAW 62

While a circular saw 62 is illustrated in FIG. 5 for severing the extruded member 51 from the removed die 29, it is to be understood that any suitable separating means can be utilized.

As illustrated in FIG. 5, the circular saw 62 is carried on a shaft 68 rotatably mounted in a support member 69 carried on a beam 70 that moves inwardly and outwardly relative to the frame 21 by the illustrated fluid operated means. The beam 70 carries a suitable electric motor 71 which, through a conventional pulley 72, rotates the shaft 68 and, thus, the saw 62 so that as the saw 62 is moved inwardly toward the extruded member 51 from the position illustrated in FIG. 4 to the position illustrated in FIG. 5, the rotating saw 62 will cut through the extruded member 51 and separate the same from the die 29 in the manner previously described.

BILLET CARRIER 64

The billet carrier 64 is carried by a movable beam 73 similar to the movable beam 70 previously described so as to be moved inwardly and outwardly relative to the frame 21 in any suitable manner, the billet carrier 64 being a suitably shaped yoke member which will support each billet 28 in order to permit the same to be loaded in the container 23 in the manner previously described as the container 23 is returned toward the crosshead 24.

For example, the billet holder 64 can include a pivotally mounted arm 74, FIG. 2, that has an end 75 that will clamp against the billet 28A and hold the same against the yoke 64 under the force of a fluid operated piston and cylinder arrangement 75' carried by the billet beam 73, the clamping force of the clamp 74 being relieved and the clamp 74 being pivoted away from the billet 28A after the forward end of the billet 28A has been received in the returning container 23 so that the billet beam 73 can be retracted from the position illustrated in FIG. 6 back to the position illustrated in FIG. 7 to receive another billet 28.

DIE RECEIVER 52

As illustrated in FIGS. 2 and 3, the stationary frame 21 of the apparatus 20 includes a guide rail 76 that remains stationary and carries a movable casting or frame 77 that is moved toward and away from the ram 22 in FIG. 3 by a fluid operated piston and cylinder arrangement generally indicated by the reference numeral 78, the cylinder of the arrangement 78 being supported by the stationary frame 21.

The movable frame 77, in turn, carries a movable beam 79 that is movable transversely to the movement of the frame 77 so as to be extended into the apparatus 20 and out of the same by a fluid operated piston and cylinder arrangement generally indicated by the reference numeral 80 in FIG. 2 having the cylinder thereof carried by the movable frame 77 and the piston thereof operatively interconnected to the beam 79 as illustrated in FIG. 2.

The die receiver 52 is carried on the end 81 of the beam 79 whereby the die receiver 52 is adapted to be moved into coaxial alignment with the rear end 27 of the container 23 when the container 23 is disposed in the position illustrated in FIG. 4 and the die receiver 52 is adapted to move toward the ram 22 with the container 23 while in the position illustrated in FIG. 4 by the frame member 77 moving toward the ram 22 in unison with the container 23 to permit the die 29 to be received in the chamber 53 of the die receiver 52 and be held thereby in the manner previously described.

DIE SERVICING ZONE

When the die receiver 52 has clamped the removed die 29 therein and the extruded member 51 has been separated therefrom by the saw 62 in the manner previously described, the beam 79 is retracted to the die servicing position illustrated in FIGS. 6 and 8 whereby the billet butt 54 carried by the removed die 29 is positioned directly under a shearing member 82, the shearing member 82 being carried by a piston 83 having its piston portion disposed in a fluid operated cylinder 84 carried by the stationary part 76 of the frame 21.

With the removed die 29 being positioned in the manner illustrated in FIGS. 6 and 8, the piston part 83 is extended downwardly from the position illustrated in FIG. 8 to the position illustrated in FIG. 9, whereby the shearing member 82 completely shears the billet butt 54 from the side 47 of the removed die 29 as illustrated in FIG. 9 so that only the extruded part 63 remains with the die 29.

The extruded part 63 is now adapted to be removed from the die 29 in a manner now to be described.

As illustrated in FIGS. 8–10, a grasping and pulling assembly for the part 63 is generally indicated by the reference numeral 85 and is carried by a stationary part 86 of the frame 21, the grasping and pulling assembly 85 comprising tong members 87 and 88 pivotally attached together by a pivot pin 89 in a scissors-like manner with the pivot pin 89 being pivotally mounted to a piston rod 90 having its piston member 91 disposed in a stationary cylinder 92 to cooperate therewith and define opposed chambers 93 and 94 on opposite sides of the piston member 91.

The scissors-like members 87 and 88 are pivotally mounted at the right-hand ends in FIG. 8 to link members 95 and 96 respectively pivotally mounted to an end 97 of a hollow piston rod 98 telescoped over the piston rod 90 and being interconnected to a piston member 99 disposed in a stationary cylinder 100 that is carried by the stationary frame 86. The piston member 99 cooperates with the cylinder 100 to define opposed chambers 101 and 102 on opposite sides of the piston member 99.

When the removed die 29 is disposed in the position illustrated in FIG. 8, pressure fluid is directed to the chambers 94 and 102 by conduits 103 and 104 whereby not only are the scissor members 87 and 88 advanced to the left over the extruded part 63, but also when the piston 91 cannot move further to the left, further movement of the piston member 99 to the left causes the scissors members 87 and 88 to tightly grip the extruded part 63 through the toggle links 95 and 96 whereby the extruded part 63 is firmly grasped. After the billet butt 54 is sheared from the die 29 in the manner illustrated in FIG. 9, pressure fluid is now directed to the chamber 101 of the cylinder 100 by a conduit 105 while the chamber 102 is being exhausted and pressure remains in the chamber 94 of the cylinder 92 whereby the gripping tong members 87 and 88 are moved to the right in the manner illustrated in FIG. 9 to completely pull the extruded part 63 from the die 29. In this manner, the die 29 is now completely cleaned so that the same can be utilized for a subsequent extruding operation.

When the grasping assembly 85 reaches the position illustrated in FIG. 10, pressure is now directed to the chamber 93 of the cylinder 92 by a conduit 105' while pressure is maintained in the chamber 101 of the cylinder 100, but since the piston member 99 cannot move further to the right from the position illustrated in FIG. 10, the piston member 91 moves further to the right from the dotted position illustrated in FIG. 10 to the full line position thereof relative to the piston rod 98 to cause the toggle members 95 and 96 to open the scissors members 87 and 88 so that the removed part 63 is released therefrom. In this manner the grasping assembly 85 can again be utilized to clean another die in the manner previously described.

It should be noted that the tong members 87 and 88 are illustrated as being disposed in a vertical relationship in FIGS. 8-10 and as being disposed in a horizontal relationship in FIGS. 3-7 for the purpose of clarity whereby it is to be understood that the rotational position of the members 87 and 88 relative to the horizontal can be varied as desired.

DIE INSERTER 65

As illustrated in FIG. 2, the die inserter 65 comprises the free end of an arm 106 having the outer end 107 thereof carried by a piston rod 108 having its piston member 109 disposed in a cylinder 110 carried on a plate-like member 111.

The plate-like member 111 pivotally carries a latch member 112 pivotally mounted to the plate 111 by a pivot pin 113 and being pivotally moved between its latching positions by a piston and cylinder arrangement 114 carried by the cylinder 110. The latch member 112 has a first latching end 115 adapted to latch with a part 116 of the movable frame 77 and another latch part 117 adapted to latch with a part 118 of the movable beam 79.

The arm 106 has its end 107 interconnected to another arm 119 in such a manner that when the arm 119 is moved against a roller 120 of the movable frame 77, as illustrated in FIG. 2, the die inserter 65 is pivoted upwardly away from the die receiver 52 so that the previously described die cleaning parts 82 and 85 can clean a removed die 29 in the manner previously described.

During the operation of the die receiver 52, the piston and cylinder arrangement 114 is operated to pivot the latch member 112 so that the latch part 115 thereof latches with the part 116 of the frame 77 while the latch part 117 is unlatched with the part 118 of the beam 79, whereby the die receiver 52 and beam 79 can be extended to the die receiving position of FIG. 4 without carrying the die inserter 65 therewith.

However, when the die receiver 52 and beam 79 are moved back from the position illustrated in FIG. 4 to the position illustrated in FIG. 6 to have the removed die 29 cleaned in the manner previously described, the piston and cylinder arrangement 114 is operated to pivot the latch member 112 so that the latch part 115 thereof is unlatched from the part 116 of the frame 77 and the latch part 117 thereof is latched to the part 118 of the beam 79 so that when the beam 79 is again moved inwardly from the position illustrated in FIG. 6 to the position illustrated in FIG. 7 to position the cleaned die 29 adjacent the container 23, the die inserter 65 moves in unison therewith and since the arm 119 is now moved away from the roller 120 of the frame 77, the arm 106 pivots downwardly against a stop member or abutment 121 of the plate 111 so that the inserter 65 is positioned in coaxial alignment with the die 29. With the die inserter 65 now disposed in the position illustrated in FIG. 7, operation of the piston and cylinder arrangement 109, 110, causes the arm 106 and inserter 65 to be moved toward the container 23 from the full line position illustrated in FIG. 7 and force the die 29 out of the die receiver 52 into the forward end of the chamber 25 of the container 23, such insertion of the die 29 from the die receiver 52 taking place when the clamping segment 55 of the die holder 52 has its clamping force relieved by the piston and cylinder arrangement 56 previously described.

After the inserter 65 has moved the die 29 into the container 23, the inserter 65 is moved back away from the container 23 relative to the die receiver 52 so that the die receiver 52 can be moved away from the container 23 from the position illustrated in FIG. 7 back to the position of FIG. 3 for a subsequent die removing operation in the manner previously described.

DIE ASSEMBLY 29

The die assembly 29 previously described for the apparatus 20 of this invention can be of the improved form illustrated in FIGS. 11-14 and also forming part of this invention.

As illustrated in FIGS. 11-14, the die assembly 29 comprises a die holder 110 and a female die member 111 carried thereby, the die holder 110 having a substantially cylindrical configuration defining the exterior surface 112 that is adapted to closely mate and seal against the internal peripheral surface of the chamber 25 of the container 23 to prevent the billet 28 from extruding therebetween during the movement of the billet 28 against the previously described face 47 thereof. However, the external peripheral surface 112 of the die holder 110 has the majority thereof relieved to the right of the side 47 thereof as illustrated in the drawings to define a true cylindrical band or part 113 at the left hand end thereof as illustrated in FIG. 12 and a plurality of longitudinally disposed reinforcing ribs 114 extending from the cylindrical part 113 to the side or face 45 thereof.

The side 47 of the die holder 110 is interrupted by a frusto-conical bore 115 that intersects with a coaxially aligned cylindrical bore 116 interrupting the other side 45 thereof, the bores 115 and 116 forming a flat annular wall 117 at the juncture thereof with the wall 117 facing to the left in FIG. 12.

The die member 111 has a frusto-conical configuration defined by opposed flat ends 118 and 119 spaced from each other by a tapering side wall 120, the configuration of the die member 111 permitting the same to be fully received in the frusto-conical bore 115 of the die holder 110 in the manner illustrated in FIG. 12 whereby the end 119 of the die member 111 fully abuts the shoulder 117 of the die holder 110, the flat end 118 of the die member 111 is substantially coplanar with the side 47 of the die holder 110 and the tapering surfaces 115 and 120 fully mate to hold the die member 111 fully concentric with the holder 110.

The die member 111 has the shaping cavity 49 passing therethrough in any suitable configuration to define the cross-sectional configuration of the elongated member 51 subsequently to be extruded therethrough.

Therefore, it can be seen that the die assembly 29 can be readily changed to extrude elongated members 51 of different cross-sectional configurations by merely removing the die member 111 from the holder 110 and inserting another die member therein having its shaping cavity of a different configuration while cooperating with the tapering bore 120 of the holder 110 in the manner previously described.

In addition, since the billet 28 is, in effect, being forced against the sides 47 and 118 of the die holder 110 and die member 111 during the extruding operation previously described for the apparatus 20, such force of the billet means tending to move to the right in FIG. 12, fully holds the die member 111 and die holder 110 in their assembled relation and prevents the billet 28 from extruding between the die holder 110 and the die member 111 by a substantially wedge sealing relation of the cooperating tapering or frusto-conical surfaces.

Since the major portion of the dies assembly 29 comprises the die holder 110, and since the die holder 110 will be the part of the assembly 29 which will wear against the interior peripheral wall of the container 23 during the extruding operation, the relatively inexpensive die holder 110 can be replaced by a similar die holder 110 when the previous die holder 110 has been worn out whereby the more expensive die member 111 will not be subjected to such adverse wearing as in the past where the entire die for indirect extrusion comprised a single piece.

However, it can be seen that the die holder 110 of this invention is so constructed and arranged with the reinforcing ribs 114 and small cylindrical part 113 to define the only wearing surfaces thereof in such a manner that excessive wear of the die holder 110 is maintained at its absolute minimum to provide a resulting relatively long life of the die holder 110.

It is to be understood that while the apparatus that has been previously described as utilizing the features of this invention is a particularly designed apparatus to accomplish the previously described indirect extrusion of the billet 28, it is to be understood that the various features of this invention can be utilized to convert existing direct extruding apparatus to an indirect extruding apparatus having the improved features of this invention.

For example, referring now to FIG. 1, conventional direct extruding apparatus each has an elongated mandrel extending from the part 67 of the crosshead 24 to be received in the billet chamber of the container 23 and bear against the left hand end of the billet 28 in order to progressively move the entire billet against the stationary die assembly 29 as the container 23 of the direct extruding apparatus is also stationary. Thus, by removing such extending mandrel portion of the crosshead 24 of the direct extruding apparatus and converting the container 23 thereof to a movable container means provided by the apparatus 20 of this invention, such conventional direct extruding apparatus can be fully converted to an indirect extruding apparatus having all of the advantages of this invention for the reasons previously set forth.

From the above description of the apparatus and method of this invention, it can be seen that the apparatus 20 can be fully automatically operated by having the various steps thereof operated in a predetermined sequence by a suitable program means or the like. Of course, each of the steps previously described for the apparatus 20 can be manually controlled as desired.

While aluminum-containing billets 28 are normally extruded at a temperature of 900° F., it may be found that after a part of the billet 28 has been extruded in the above manner, a freeze-up condition might exist under certain conditions whereby the container 23 will have to have the partially extruded billet removed therefrom as further extrusion thereof cannot take place. Under this condition, the apparatus 20 of this invention can readily clear this adverse condition by backing the crosshead 24 away from the container 23 and moving the container 23 toward the ram 22 by the pistons and cylinders 38, 39 whereby the ram 22 will force the unextruded part of the billet and die 29 out of the rear end 27 of the container 23 in the manner previously described.

From the above, it can be seen that the various features of the indirect extruding apparatus of this invention has basic advantages over the conventional direct extruding apparatus wherein the mandrel is moved against the rear end of the billet to move the billet toward a fixed female die member and extrude the same therethrough whereby the entire billet must be moved relative to the interior wall of the stationary container containing the billet and die. Thus, in direct extruding operations, the initial pressure required to cause a breakthrough of the billet being forced against the die is approximately 50% greater than the pressure required toward the end of the extruding operation, whereas in the indirect extruding operation of this invention, the starting pressure is almost equal to or only about 5% higher than the ending pressure required whereby the pressure required in the indirect extruding operation is substantially half of the pressure required for the direct extruding operation for billets of like size.

Further, it has been found that at present the billet volume utilized in a direct extruding operation is limited by the billet diameter and its length because of the friction caused by the billet moving relative to the container wall and because of the shear forces within the billet during the extruding operation, such features limiting the billet length to approximately three times its diameter. However, in the indirect extrusion of this invention, a much longer billet can be used since only its front portion is taking part in the extruding operation whereby the overall dead time required for placing the new billets in the indirect extrusion apparatus will be less than the dead time for inserting new billets in the direct extruding apparatus so that the production capicity of the indirect extrusion apparatus will be approximately 20 to 30% higher than with the present direct presses.

It has also been found that the break-through time required for initially forcing a billet through a female die member varies from 0 to 30 minutes for hard alloys depending upon the shape configuration and the extrusion and ratio. However, since only the metal of the billet close to the die in the indirect extruding apparatus is taking part in the forming of the extrusion, the break-through time, particularly when producing heavy and difficult shapes, is considerably less than the break-through time in the direct extruding operations that large size indirect extruding presses will have considerably larger production capacities than direct extruding presses when producing difficult extrusions from hard alloys.

While the present preferred embodiment of this inven-

What is claimed is:

1. Apparatus for extruding members from metallic billets and the like comprising a frame, a container movably carried by said frame and having a chamber therein for receiving one of said billets, said chamber having opposed open ends at opposed ends of said container, a female die disposed in one end of said chamber and through which said billet is extruded, a ram carried by said frame and having a front end, means to move said container toward said ram to cause said die to engage against said front end of said ram and said billet to extrude through said die as said container and billet further move toward said ram relative to said engaged die, a die receiver carried by said frame to receive said die from the other end of said chamber of said container after said billet has been extruded therethrough a predetermined amount, and means for causing relative movement between said die receiver and said container to cause said die receiver to traverse said container from said other end thereof to said one end thereof for a subsequent insertion of said received die from said die receiver into said one end of said chamber.

2. Apparatus as set forth in claim 1 wherein said container moving means comprises a cross-head movably carried by said frame and engageable against said other end of said container to move said container in unison therewith.

3. Apparatus as set forth in claim 2 wherein said cross-head closes said other end of said chamber when said cross-head engages said other end of said container.

4. Apparatus as set forth in claim 3 and including means for tending to move said container toward said cross-head when said cross-head is moving said container during the extruding of said billet to prevent said billet from extruding between said cross-head and said other end of said container.

5. Apparatus as set forth in claim 1 and including means for moving said container toward said ram until said other end of said container has passed beyond said front end of said ram to cause said die to pass out of said other end of said container into said die receiver.

6. Apparatus as set forth in claim 5 wherein said means for moving said container relative to said ram comprises a cross-head carried by said frame for moving said container during said extruding of said billet and a separate means for moving said container toward said ram for the die removing operation.

7. Apparatus as set forth in claim 5 and including a separator for separating the extruding member of said billet from said die after said die is forced out of said other end of said container into said die receiver whereby a remaining billet butt is disposed on one side of said die and a part of said extruded member remains in said die and extends out of the other side thereof.

8. Apparatus as set forth in claim 7 and including a die cleaner carried by said frame for removing said billet butt and said part of said extruded member from said die.

9. Apparatus for extruding members from metallic billets and the like comprising a frame, a container movable carried by said frame and having a chamber therein for receiving one of said billets, said chamber having opposed open ends at opposed ends of said container, a female die disposed in one end of said chamber and through which said billet is extruded, a ram carried by said frame and having a front end, means to move said container toward said ram to cause said die to engage against said front end of said ram and said billet to extrude through said die as said container and billet further move toward said ram relative to said engaged die, and a die receiver carried by said frame to receive said die from said other end of said chamber of said container after said billet has been extruded therethrough a predetermined amount, said die receiver and said container being relatively movable whereby said die receiver traverses said container from said other end thereof to said one end thereof for inserting said received die in said one end of said chamber, means for moving said container toward said ram until said other end of said container has passed beyond said front end of said ram to cause said die to pass out of said other end of said container into said die receiver, a separator for separating the extruded member of said billet from said die after said die is forced out of said other end of said container into said die receiver whereby a remaining billet butt is disposed on one side of said die and a part of said extruded member remains in said die and extends out of the other side thereof, and a die cleaner carried by said frame for removing said billet butt and said part of said extruded member from said die, said die cleaner comprising a shearing member for shearing said billet butt from said one side of said die while leaving said part of said extruded member in said die.

10. Apparatus as set forth in claim 9 wherein said die cleaner includes tongs for grasping said part of said extruded member at said other side of said die and pulling the same out of said other side of said die.

11. Apparatus as set forth in claim 1 and including a billet loader for loading another billet in said container after said die has been removed, and a die inserted cooperating with said die receiver for inserting said removed die from said die receiver back into said container at said one end thereof for a subsequent extruding operation on said other billet.

12. Apparatus as set forth in claim 1 wherein said die comprises a die holder having an outer surface that cooperates with the chamber defining surface of said container, said die holder having a frusto-conical bore interrupting one side thereof, and a die member having a die cavity passing therethrough and through which said billet is extruded, said die member having a frusto-conical configuration mating with said bore whereby said die member is carried by said die holder.

13. A method for extruding members from metallic billets and the like comprising the steps of disposing one of said billets in a chamber of a container, disposing a female die from a die receiver into said chamber of said container at one end thereof, moving said container toward a ram to cause said die to engage against the front end of said ram and said billet to extrude through said die as said container and billet further move toward said ram relative to said engaged die, causing said die to be removed from the other end of said container after said billet has been extruded therethorugh a predetermined amount and be received in said die receiver, causing relative movement between said die receiver and said container so that said die receiver traverses said container from said other end thereof to said one end thereof with said received die, and inserting said die from said die receiver into said one end of said chamber when said die receiver is adjacent said one end of said container.

14. A method as set forth in claim 13 wherein said step of moving said container toward said ram includes the step of moving a cross-head against said other end of said container to move said container in unison therewith.

15. A method as set forth in claim 14 and including the step of closing said other end of said chamber at said other end of said container with said cross-head as said cross-head moves said container.

16. A method as set forth in claim 15 and including the step of forcing said container toward said cross-head with a certain force during the step of moving said container toward said ram with said cross-head to prevent said billet from extruding between said cross-head and said other end of said container during the extruding of said billet through said die.

17. A method as set forth in claim 13 wherein said step of removing said die includes the step of moving said container further toward said ram after said extruding step to cause said ram to force said die out of said other end of said container into said die receiver.

18. A method as set forth in claim 17 wherein said step of moving said container toward said ram for said extruding step includes the step of moving a cross-head against said container to move said container in unison therewith and wherein said step of further moving said container for removing said die includes the step of moving said container with means other than said cross-head.

19. A method as set forth in claim 17 and including the step of separating the extruded member of said billet from said die after said die means is forced from said other end of said container, said separating step causing remaining billet butt of said billet to be disposed on one side of said die and a part of said extruded member to remain in said die and extend out of the other side thereof.

20. A method as set forth in claim 19 and including the step of removing said billet butt and said part of said extruded member from said die after said separation step.

21. A method as set forth in claim 20 wherein said last-named removing step includes the step of separating said billet butt from said one side of said die to leave said part of said extruded member in said die.

22. A method as set forth in claim 21 wherein said last-named separating step includes the step of shearing said billet butt from said part of said extruded member.

23. A method as set forth in claim 21 wherein said last-named removing step includes the step of grasping and pulling said part of said extruded member from said die.

24. Apparatus for extruding members from metallic billets and the like comprising a frame, a container movably carried by said frame and having a chamber therein for receiving one of said billets, said chamber having opposed open ends at opposed ends of said container, a female die disposed in one end of said chamber and through which said billet is extruded, a ram carried by said frame and having a front end, means to move said container toward said ram to cause said die to engage against said front end of said ram and said billet to extrude through said die as said container and billet further move toward said ram relative to said engaged die, a die receiver carried by said frame to receive said die from said other end of said chamber of said container after said billet has been extruded therethrough a predetermined amount, said die receiver and said container being relatively movable whereby said die receiver traverses said container from said other end thereof to said one end thereof for inserting said received die in said one end of said chamber, and means for moving said container toward said ram until said other end of said container has passed beyond said front end of said ram to cause said die to pass out of said other end of said container into said die receiver, said means for moving said container relative to said ram comprising a cross-head carried by said frame for moving said container during said extruding of said billet and a separate means for moving said container toward said ram for the die removing operation, said die receiver being mounted on a sliding beam for moving said die receiver transversewise into said apparatus and then moving said die receiver in unison with the container until the die is shifted from said container into said die receiver.

References Cited

UNITED STATES PATENTS

| 1,661,594 | 3/1928 | Born | 72—272 |
| 3,184,944 | 5/1965 | Sibler | 72—255 |
| 1,609,988 | 12/1926 | Bull | 72—255 |
| 3,178,925 | 4/1965 | Nolan | 72—253 X |
| 2,167,845 | 8/1939 | Klocke | 72—255 |

FOREIGN PATENTS 254,293    8/1926    Great Britain.

CHARLES W. LANHAM, Primary Examiner

A. L. HAVIS, Assistant Examiner

U.S. Cl. X.R.

72—253, 263, 272, 273